US011947062B2

(12) United States Patent
Liu

(10) Patent No.: US 11,947,062 B2
(45) Date of Patent: Apr. 2, 2024

(54) VELOCITY TOMOGRAPHY USING TIME LAGS OF WAVE EQUATION MIGRATION

(71) Applicant: ExxonMobil Technology and Engineering Company, Spring, TX (US)

(72) Inventor: Jonathan Liu, Houston, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 385 days.

(21) Appl. No.: 17/247,526

(22) Filed: Dec. 15, 2020

(65) Prior Publication Data

US 2021/0255345 A1     Aug. 19, 2021

Related U.S. Application Data

(60) Provisional application No. 62/975,946, filed on Feb. 13, 2020.

(51) Int. Cl.
*G01V 1/28*      (2006.01)
*E21B 47/002*     (2012.01)
(Continued)

(52) U.S. Cl.
CPC .......... *G01V 1/282* (2013.01); *E21B 47/0025* (2020.05); *E21B 49/00* (2013.01);
(Continued)

(58) Field of Classification Search
CPC ........ G01V 1/282; G01V 1/301; G01V 1/305; G01V 1/345; G01V 1/368; G01V 99/005; G01V 2210/66
See application file for complete search history.

(56) References Cited

U.S. PATENT DOCUMENTS 7,675,818 B2    3/2010   Liu et al.
8,406,081 B2 *   3/2013   Xia ........................ G01V 1/303
                                                         702/18

(Continued)

FOREIGN PATENT DOCUMENTS

WO    WO-2017136133 A1 *   8/2017  ............. E21B 49/00

OTHER PUBLICATIONS

Chevron et al., High-resolution image-guided tomography and Q-tomography solution for improved depth imaging for an OBC survey, 2017, SEG International Exposition and 87th Annual Meeting, pp. 5666-5670 (Year: 2017).*

(Continued)

*Primary Examiner* — Mischita L Henson
(74) *Attorney, Agent, or Firm* — ExxonMobil Technology and Engineering Company—Law Department

(57) ABSTRACT

Velocity tomography using time lags of wave equation migration is disclosed. Seismic tomography is a technique for imaging the subsurface of the Earth with seismic waves by generated a migration velocity model from a multitude of observations using combinations of source and receiver locations. The migration velocity model may be updated in order to reduce depth differences of reflection events (also called residual depth errors (RDE)). Direct measurement of RDE may be difficult in certain complex subsurface areas. In such areas, the RDE may be reconstructed based on time lags of wave equation migration and then used to update the migration velocity model. In particular, the RDE may be directly reconstructed from the time lags of wave equation migration, such as based on a direct relation between RDE and the time lags.

20 Claims, 3 Drawing Sheets

(51) Int. Cl.
*E21B 49/00* (2006.01)
*G01V 1/18* (2006.01)
*G01V 1/30* (2006.01)
*G01V 1/34* (2006.01)
*G01V 1/36* (2006.01)
*G01V 20/00* (2024.01)
*G06N 20/00* (2019.01)

(52) U.S. Cl.
CPC .............. *G01V 1/181* (2013.01); *G01V 1/301* (2013.01); *G01V 1/305* (2013.01); *G01V 1/345* (2013.01); *G01V 1/368* (2013.01); *G01V 20/00* (2024.01); *E21B 2200/20* (2020.05); *G01V 2210/66* (2013.01); *G06N 20/00* (2019.01)

(56) References Cited

U.S. PATENT DOCUMENTS

| | | | |
|---|---|---|---|
| 9,482,770 | B2 | 11/2016 | Sun |
| 10,310,113 | B2 | 6/2019 | Sun et al. |
| 2013/0258810 | A1* | 10/2013 | Hu ......................... G01V 1/303 367/73 |
| 2016/0109589 | A1 | 4/2016 | Liu |
| 2017/0097428 | A1* | 4/2017 | Sun ........................ G01V 1/303 |
| 2017/0285194 | A1* | 10/2017 | Park ........................ G01V 1/282 |
| 2021/0302606 | A1* | 9/2021 | Al-Saleh .................. G01V 1/34 |

OTHER PUBLICATIONS

Liu, Z. (1997) "An Analytical Approach to Migration Velocity Analysis", Geophysics, vol. 62, No. 4, pp. 1238-1249.

Liu, J. et al. (2018) "Velocity Tomography Using Property Scans", 2018 SEG Expanded Abstracts, pp. 5157-5161.

Mackay, S., and Abma, R. (1993) "Depth-focusing Analysis using a Wavefront-curvature Criterion", Geophysics, vol. 58, No. 8, pp. 1148-1156.

Sheriff, R. E. (2002), Encyclopedic Dictionary of Applied Geophysics, 4th Ed., p. 361.

Yang, T., and Sava, P. (2013) "3D Angle Gathers from Wave-equation Extended Images", 2013 SEG Expanded Abstracts, pp. 4816-4821.

* cited by examiner

VELOCITY TOMOGRAPHY USING TIME LAGS OF WAVE EQUATION MIGRATION

CROSS REFERENCE TO RELATED APPLICATION

This application claims the benefit of priority of U.S. Provisional Application No. 62/975,946, filed Feb. 13, 2020, the disclosure of which is incorporated herein by reference in its entirety.

TECHNICAL FIELD

This disclosure relates generally to the field of geophysical prospecting and, more particularly, to seismic data processing. Specifically, this disclosure is directed to a methodology of determining residual depth errors for reflection tomography in velocity model building.

BACKGROUND

This section is intended to introduce various aspects of the art, which may be associated with exemplary embodiments of the present disclosure. This discussion is believed to assist in providing a framework to facilitate a better understanding of particular aspects of the present disclosure. Accordingly, it should be understood that this section should be read in this light, and not necessarily as admissions of prior art.

Seismic tomography is a technique for imaging the subsurface of the Earth with seismic waves produced by earthquakes or explosions. In particular, seismic tomography may be defined as a method for finding the velocity and reflectivity distribution from a multitude of observations using combinations of source and receiver locations. (Encyclopedic Dictionary of Applied Geophysics, 4th Ed., R. E. Sheriff)

Reflection tomography uses data from a seismic survey in which both sources and receivers were placed on the surface. One technique of reflection tomography comprises tomographic inversion, which may be used to build models, such as in the form of data volumes that give seismic wave velocity values within a subsurface region of interest. One example of this is disclosed in U.S. Pat. No. 7,675,818, incorporated by reference herein in its entirety. In practice, migrated gathers (e.g., offset or angle gathers) are used for updating the velocity model, and the flatness of the gathers, which is measured by the depth differences of the same reflection event in the different traces of a gather, provides information whether the migration velocity model is correct or not. Typically, there is no depth difference of the same reflection event in all traces of each gather, when the migration velocity model is correct. Those depth differences are also called residual depth errors ("RDE") because they describe the relative depths errors of the same reflection event in different traces of a gather. The velocity model may then be perturbed, with the objective of reducing the RDE, and the process is repeated iteratively to optimize the model. As one example, the depth-migrated gathers from angle domain Kirchhoff migration may be analyzed to determine whether curvature is present. If so, the velocity model may be updated with the determined curvature. In turn, the depth-migrated gathers, generated by the updated velocity model, may be analyzed again to determine whether curvature is presented. If so, the velocity model may be updated again with the determined curvature. This process may be iteratively performed until the depth-migrated gathers are flat (or substantially flat). In this regard, successful implementation of tomographic inversion for velocity model building relies on reliable measurement of RDE in the migrated subsurface image (in which migration, or imaging, is a data processing technique that moves subsurface reflectors to their correct locations).

Measurement of RDE is difficult in complex imaging areas. Specifically, direct measurement of RDE for Kirchhoff-type migration is generally difficult in complex imaging areas, such as in sub-salt, due to the failure of ray tracing in complicated velocity models. In such complex imaging areas, wave equation migration may provide superior quality of imaging in such environments. However, generating offset or angle gathers from wave equation migration is extremely computationally expensive, thereby being impractical.

Several methods are directed to solving this problem. One method uses a Dix-like equation approach in which the velocity model is updated from time lags of migration by using a Dix-Like formula based on 1D assumption. See Mackay, S., and Abma, R., "Depth-focusing analysis using wavefront-curvature criterion: Geophysics", 57, 1608-1622 (1992). Another method computes derivatives of the image with respect to velocity using the relationship between image perturbation from time lags and velocity perturbation to update velocity model. See Yang, T., and Sava, P., 2013, 3D angle gathers from wave-equation extended images: 2013 SEG Expanded Abstracts, 4816-4821.

SUMMARY

A computer-implemented method for transforming seismic data into a subsurface physical property model is disclosed. The method comprises: accessing the seismic data; and constructing the subsurface physical property model by performing tomographic inversion of the seismic data, using a computer, with residual depth errors (RDE), wherein the RDE are reconstructed from time lags of wave equation migration.

DESCRIPTION OF THE FIGURES

The present application is further described in the detailed description which follows, in reference to the noted plurality of drawings by way of non-limiting examples of exemplary implementations, in which like reference numerals represent similar parts throughout the several views of the drawings. In this regard, the appended drawings illustrate only exemplary implementations and are therefore not to be considered limiting of scope, for the disclosure may admit to other equally effective embodiments and applications.

DETAILED DESCRIPTION

Figure 1:
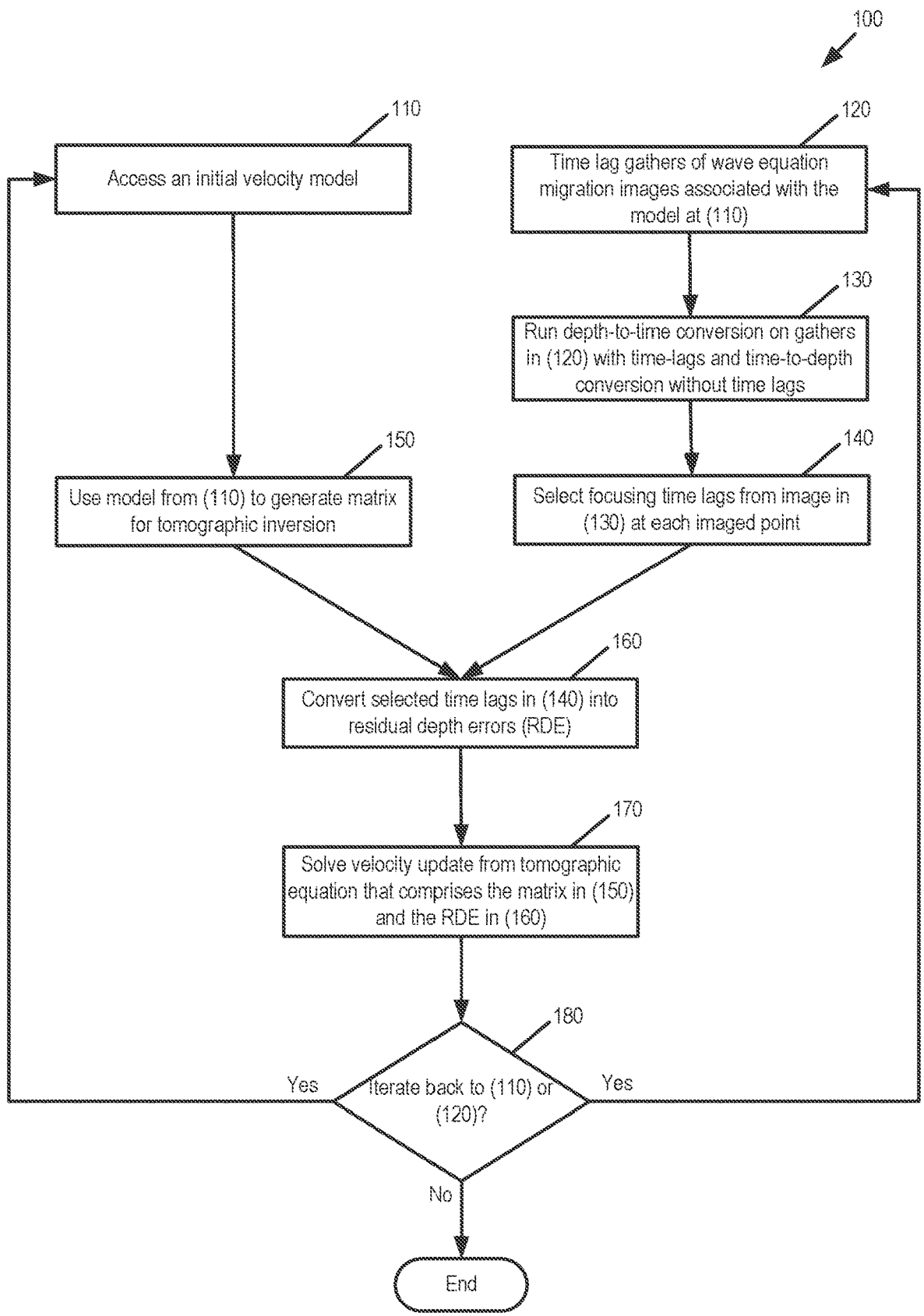
FIG. 1 is a flow diagram of an example of velocity tomography using time lags.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

Further, variations in the processes described, including the addition, deletion, or rearranging and order of logical operations, may be made without departing from the spirit or scope of the claims as set forth herein.

It is to be understood that the present disclosure is not limited to particular devices or methods, which may, of course, vary. It is also to be understood that the terminology used herein is for the purpose of describing particular embodiments only, and is not intended to be limiting. As used herein, the singular forms "a," "an," and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected. The word "exemplary" is used herein to mean "serving as an example, instance, or illustration." Any aspect described herein as "exemplary" is not necessarily to be construed as preferred or advantageous over other aspects. The term "uniform" means substantially equal for each sub-element, within about ±10% variation.

The term "seismic data" as used herein broadly means any data received and/or recorded as part of the seismic surveying and interpretation process, including displacement, velocity and/or acceleration, pressure and/or rotation, wave reflection, and/or refraction data. "Seismic data" is also intended to include any data (e.g., seismic image, migration image, reverse-time migration image, pre-stack image, partially-stack image, full-stack image, post-stack image or seismic attribute image) or interpretation quantities, including geophysical properties such as one or more of: elastic properties (e.g., P and/or S wave velocity, P-Impedance, S-Impedance, density, attenuation, anisotropy and the like); and porosity, permeability or the like, that the ordinarily skilled artisan at the time of this disclosure will recognize may be inferred or otherwise derived from such data received and/or recorded as part of the seismic surveying and interpretation process. Thus, this disclosure may at times refer to "seismic data and/or data derived therefrom," or equivalently simply to "seismic data." Both terms are intended to include both measured/recorded seismic data and such derived data, unless the context clearly indicates that only one or the other is intended. "Seismic data" may also include data derived from traditional seismic (i.e., acoustic) data sets in conjunction with other geophysical data, including, for example, gravity plus seismic; gravity plus electromagnetic plus seismic data, etc. For example, joint-inversion utilizes multiple geophysical data types.

The terms "velocity model," "density model," "physical property model," or other similar terms as used herein refer to a numerical representation of parameters for subsurface regions. Generally, the numerical representation includes an array of numbers, typically a 2-D or 3-D array, where each number, which may be called a "model parameter," is a value of velocity, density, or another physical property in a cell, where a subsurface region has been conceptually divided into discrete cells for computational purposes. For example, the spatial distribution of velocity may be modeled using constant-velocity units (layers) through which ray paths obeying Snell's law can be traced. A 3-D geologic model (particularly a model represented in image form) may be represented in volume elements (voxels), in a similar way that a photograph (or 2-D geologic model) is represented by picture elements (pixels). Such numerical representations may be shape-based or functional forms in addition to, or in lieu of, cell-based numerical representations. Further, Subsurface model is a numerical, spatial representation of a specified region in the subsurface.

Geologic model is a subsurface model that is aligned with specified faults and specified horizons.

Reservoir model is a geologic model where a plurality of locations have assigned properties including rock type, environment of deposition (EoD), subtypes of EoD (sub-EoD), porosity, permeability, fluid saturations, etc.

For the purpose of the present disclosure, subsurface model, geologic model, and reservoir model are used interchangeably unless denoted otherwise.

Stratigraphic model is a spatial representation of the sequences of sediment and rocks (rock types) in the subsurface.

Structural model or framework results from structural analysis of reservoir based on the interpretation of 2D or 3D seismic images. As examples, the reservoir framework comprises horizons, faults and surfaces inferred from seismic at a reservoir section.

As used herein, "hydrocarbon management" or "managing hydrocarbons" includes any one or more of the following: hydrocarbon extraction; hydrocarbon production, (e.g., drilling a well and prospecting for, and/or producing, hydrocarbons using the well; and/or, causing a well to be drilled, e.g., to prospect for hydrocarbons); hydrocarbon exploration; identifying potential hydrocarbon-bearing formations; characterizing hydrocarbon-bearing formations; identifying well locations; determining well injection rates; determining well extraction rates; identifying reservoir connectivity; acquiring, disposing of, and/or abandoning hydrocarbon resources; reviewing prior hydrocarbon management decisions; and any other hydrocarbon-related acts or activities, such activities typically taking place with respect to a subsurface formation. The aforementioned broadly include not only the acts themselves (e.g., extraction, production, drilling a well, etc.), but also or instead the direction and/or causation of such acts (e.g., causing hydrocarbons to be extracted, causing hydrocarbons to be produced, causing a well to be drilled, causing the prospecting of hydrocarbons, etc.). Hydrocarbon management may include reservoir surveillance and/or geophysical optimization. For example, reservoir surveillance data may include, well production rates (how much water, oil, or gas is extracted over time), well injection rates (how much water or $CO_2$ is injected over time), well pressure history, and time-lapse geophysical data. As another example, geophysical optimization may include a variety of methods geared to find an optimum model (and/or a series of models which orbit the optimum model) that is consistent with observed/measured geophysical data and geologic experience, process, and/or observation.

As used herein, "obtaining" data generally refers to any method or combination of methods of acquiring, collecting, or accessing data, including, for example, directly measuring or sensing a physical property, receiving transmitted data, selecting data from a group of physical sensors, identifying data in a data record, and retrieving data from one or more data libraries.

As used herein, terms such as "continual" and "continuous" generally refer to processes which occur repeatedly over time independent of an external trigger to instigate subsequent repetitions. In some instances, continual processes may repeat in real time, having minimal periods of inactivity between repetitions. In some instances, periods of inactivity may be inherent in the continual process.

If there is any conflict in the usages of a word or term in this specification and one or more patent or other documents that may be incorporated herein by reference, the definitions that are consistent with this specification should be adopted for the purposes of understanding this disclosure.

As discussed in the background, in certain areas, such as complex imaging areas, direct measurement of RDE is difficult. In such cases, model updating using time lags of wave equation migration, which is an attractive option due to its relatively low computational cost, may be used. However, certain solutions that use time lags to update the velocity model may suffer drawbacks. For example, using a Dix-like equation may generate an inaccurate formulation for complex structures where the 1D assumption is invalid. As another example, computing derivatives of the image with respect to velocity uses an algorithm that is a complicated and whose successful implementation relies on the accuracy of amplitude of image that is difficult to attained in complex environments.

In one or some embodiments, RDE may be reconstructed based on time lags of wave equation migration. The reconstructed RDE may then be imported into the tomographic inversion work flow, so that the model is updated through velocity tomographic inversion. More specifically, RDE may be directly reconstructed from the time lags of wave equation migration, such as based on a direct relation between RDE and the time lags. The relation (such as the direct relation) between RDE and time lags of wave equation migration is based on the proposition that a migrated gather has a predetermined orientation (e.g., is flat) when the depth image is focused at this location. As discussed in further detail below, this proposition is the basis for deriving the relation between RDE and time lags of wave equation migration. In this regard, such use of time lags (by reconstructing RDE) may more efficiently and more accurately be used to update the velocity model.

Further, in one or some embodiments, this direct relation between RDE and the time lags may be the sole criterium used to determine RDE (particularly where the gathers are incomplete or unavailable). As one example, a formulation may relate time lags with RDE, such as discussed below with regard to Equation (5). Alternatively, the direct relation between RDE and the time lags may be one criterium, among one or more other criteria, in which to determine RDE. As one example, RDE may be determined based on a combination of: (1) the direction relation between RDE and the time lags, and (2) based on another determination of RDE (such as based on direct measurements of RDE and/or based on velocity scans, such as disclosed in US Patent Application Publication No. 2016/0109589 A1, incorporated by reference herein in its entirety). As discussed in more detail below, the separate determinations for RDE (such as based on (1) and (2)) may be combined, such as averaged, in order to determined overall RDE.

Various criteria are contemplated to select the time lags for reconstructing the RDE. As one example, the flattest pseudo migration gathers may be used to determine the time lag. In particular, pseudo migration offset gathers generated by one-way wave equation migration or reverse time migration (RTM) may be used to determine the time lag. As another example, the best migrated stack responses (e.g., stacked images generated by one-way wave equation migration or RTM) may be used to determine the time lag.

The reconstructed RDE may be imported into a tomographic inversion work flow (such as the tomographic inversion work flow disclosed in US Patent Application Publication No. 2016/0109589 A1, incorporated by reference herein in its entirety), so that the model is updated through velocity tomographic inversion. In particular, the RDE, based on time lags, may be used in a variety of tomographic inversion workflows including without limitation a ray-based tomographic inversion workflow and wave-based tomographic inversion workflow. See U.S. Pat. Nos. 9,482,770 and 10,310,113, both of which incorporated by reference herein in their entirety; see also U.S. Pat. No. 7,675,818. The RDE may thus be used to update one or more aspects of the model, including any one, any combination, or all of: vertical velocity; anisotropy parameters; or other parameters contributed to velocity.

Thus, the RDE reconstructed from time lags may be incorporated in a variety of tomographic inversions. As one example, the following methodology may be used: (1) generate wave-equation migration time-lag gathers; (2) run zero-offset de-migration with time-lags and zero-offset re-migration without time-lags; (3) select focusing time lags at imaged points; (4) convert selected time lags into residual depth move-out; and (5) run tomographic inversion on the residual depth move-out to update model. A more specific example of this methodology is illustrated in FIG. 1, which is a flow chart 100 of one example embodiment of a tomographic work flow. Though not shown in the drawings, a seismic data set may be an input quantity for 110 and 120. The seismic data set may comprise, for example, one or both of common-offset gathers or common-shot gathers. At 110, an initial velocity model may be accessed. As one example, a suite of velocity models may be selected, being mindful of the small perturbation assumption. Thereafter, an initial velocity model may be selected from one of the suite of velocity models available. As discussed above, the term "model" may refer to a velocity model. In the case of an anisotropic medium, this may comprise a model of a component of velocity, such as the vertical component or the horizontal component, or a model of any one or more of the anisotropy parameters. Alternatively, the term may refer to any other property of the medium that affects a kinematic property of propagation of acoustic waves, such as, for example, the position of horizons that define a region in a velocity model.

The base model may thus be the starting model for the iterative tomography inversion process. Also, the matrix A for the tomographic inversion is generated, such as disclosed in Liu, Z., "An analytical approach to migration velocity analysis," Geophysics 62, 1238-1249 (1997). The matrix A operating on a velocity model may predict the depth of each image point according to that velocity model.

At 150, the model from 110 may be used to generate a matrix for tomographic inversion. This may be performed, for example, by multiplying the tomographic inversion matrix A by the difference between the base migration velocity model and, in turn, the velocity model accessed at 110 (where the velocity models are expressed as vectors). For example, tables of the depth errors may be generated for a plurality of image points (such as all image points or alternatively, at least a sufficient number of image points to construct an image). In one or some embodiments, the depth error for each image point is the difference in migrated depth as migrated by a velocity model from 110 as compared to when migrated by the base migration model. A table of depth errors for a particular image point may thus show a value of depth error for each of various migration velocity models at that image point.

At 120, time lag gathers of wave equation migration images associated with the model at 110 are accessed. At 130, depth-to-time conversion on the gathers in 120 are run, such as with time-lags and/or time-to-depth conversion without time lags. In this way, migrated images may be formed from the seismic data. At 140, time lags from the image at 130 at each imaged point may be selected. As discussed above, various criteria are contemplated to select the time lags for reconstructing the RDE.

Figure 2:
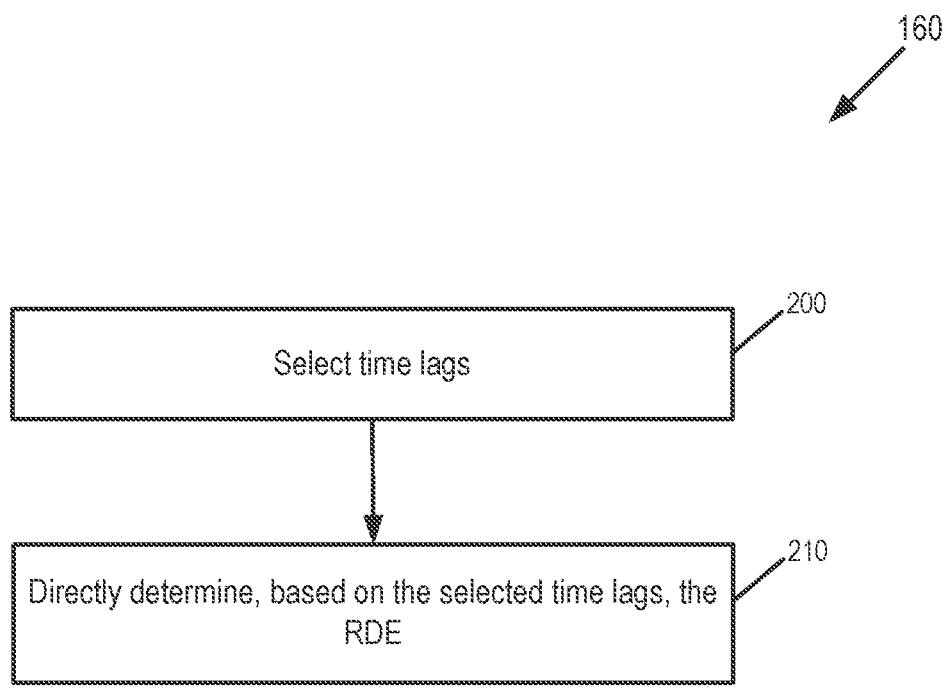
FIG. 2 is a flow diagram of an example of calculating RDE from time lags.

At 160, the selected time lags are converted into RDE. 160 is illustrated, for example, in FIG. 2, discussed below. At 170, the velocity update from tomographic equation that comprises the matrix in 150 and the RDE in 160) is solved. For example, the velocity model update may be obtained by numerically solving for Av according to the following:

$$(DA)\Delta v = Dz_m \qquad (1)$$

$Dz_m$ of equation (1) is the reconstructed residual depth error from 160, and the matrix A, which is composed of the gradients of imaged depth with respect to the model parameters, is from 150.

Further, tomographic inversion using measured RDEs in combination with derived RDEs may be alternatively be used. For example, the measured RDE (as indicated by the curvature of the depth-migrated gathers) and the derived RDE (based on the time lag) may both be used in order to update the velocity model. In this regard, instead of using only the reconstructed residual depth errors in 170, 170 may be performed using the reconstructed residual depth errors combined with residual depth errors generated using the base migration velocity model.

The accuracy of the updated model may be improved by iterating the process. For example, at 180, it may be determined whether to return to 110 and/or 120, and using the updated model as the base model in the next iteration. If the suite of velocity models used in the previous iteration is considered suitable to use again, the next iteration may skip various steps, such as 110, and begin with 150. The suite of velocity models, however, may be regenerated using the new base model, for example with scaling factors.

In one or some embodiments, a relation, such as a formula, may be used to directly reconstruct RDE from time lags of wave equation migration. The reconstructed RDE may be imported into a tomographic inversion work flow (see FIG. 1), such as a conventional tomographic inversion work flow, so that the model will be updated through velocity tomographic inversion. In particular, FIG. 2 is a flow diagram of an example of calculating RDE, such as in 160, from time lags. At 200, a time lag may be selected. As discussed above, the criterion (or criteria) to pick the time lags may comprise the flattest pseudo migration gathers or the best migrated stack responses. At 210, the RDE may be directed determined based on the selected time lags (such as via a formula, discussed further below).

The derivation of the formula may be based on a migrated gather being flat when the depth image is focused at this location. Mathematically, at each imaging point, the time lag τ may be formulated by the following:

$$z(\alpha, 0) = z(\alpha, \tau) - \frac{v}{\cos\theta_s + \cos\theta_g}\tau \qquad (2)$$

where z is the imaged depth, α is the open angle at the image point, v is the velocity, $\theta_s$ is reflection angle from shot, and $\theta_g$ is reflection angle from geophone. The deviation operator, D, which operates on a n-dimensional vector z={$z_j$}, may be defined by:

$$(Dz)_i \equiv z_i - \frac{1}{n}\sum_j z_j \qquad (3)$$

In one or some embodiments, n is the number of open angles and j is the angle index. Applying the operator D on both sides of equation (2), one may use the following:

$$\Delta z(\alpha, \tau) = 0 \qquad (4)$$

When the image is focused at time lag τ, the following formulation may be derived to reconstruct RDE from time lags:

$$Dz(\alpha, 0) = -D\left(\frac{v}{\cos\theta_s + \cos\theta_g}\right)\tau \qquad (5)$$

Equation (5) may thus be used to convert time lag into residual depth move-out that may be imported into various tomographic inversion workflows for updating velocity, such as illustrated in FIG. 1. Equation (4) may also be used to reconstruct RDE from velocity scans (See US Patent Application Publication No. 2016/0109589 A1).

Compared to a conventional tomographic inversion work flow, which estimates Dz from Kirchhoff migration gathers, the disclosed methodology obtains a more reliable estimation of Dz in complex imaging areas, which may be converted from the focused time lag of wave equation migration. Therefore, the disclosed methodology may yield a more accurate way to update velocity.

Thus, in one or some embodiments, the methodology uses the most-focused image picks from time lags of wave equation migration. In this regard, the methodology may rely on any one or both of: (1) an efficient and accurate way to generate time lag gathers of wave equation migration; or (2) an efficient and accurate way to pick focusing event in time lags. Equation (2) is valid based on the assumption of a small perturbation, so that the difference between the initial migration velocity and true velocity is within some threshold (such as 10%).

Figure 3:
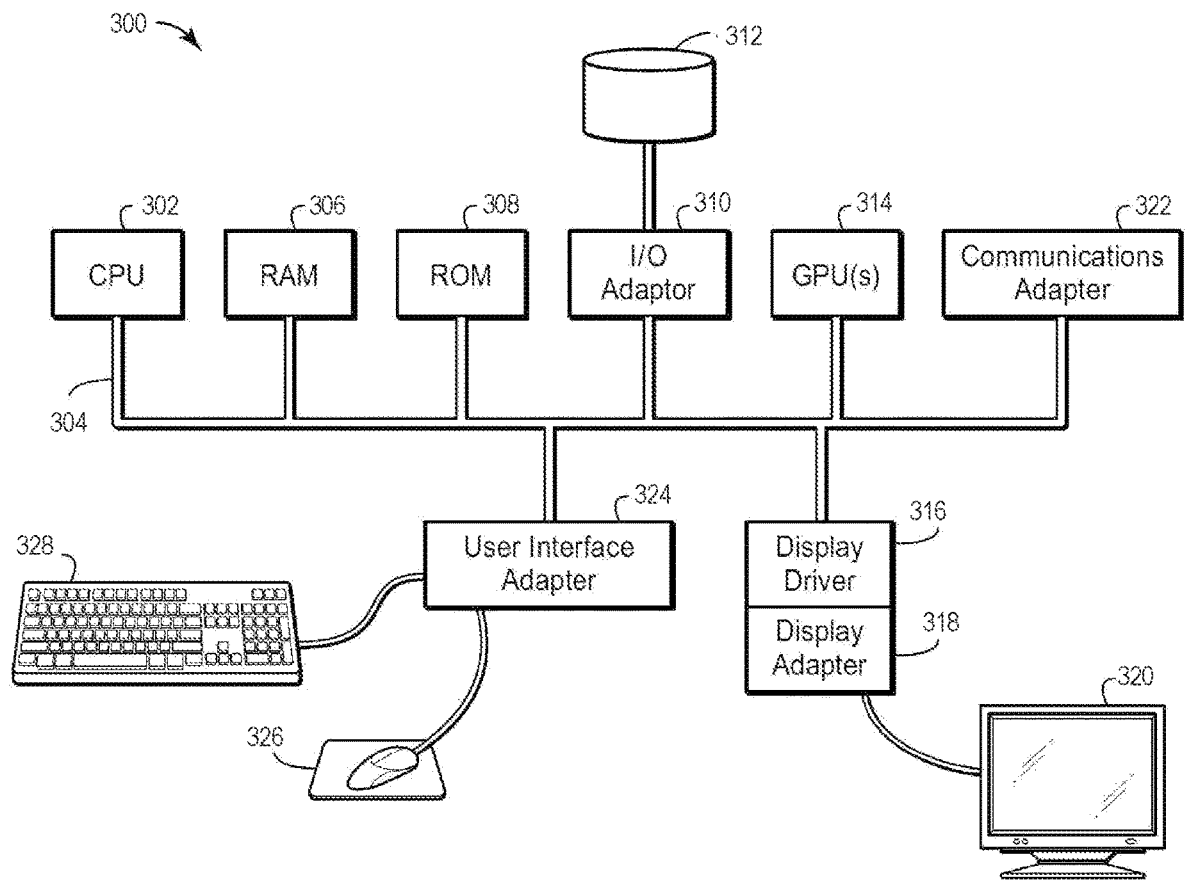
FIG. 3 is a diagram of an exemplary computer system that may be utilized to implement the methods described herein.

In all practical applications, the present technological advancement must be used in conjunction with a computer, programmed in accordance with the disclosures herein. For example, FIG. 3 is a diagram of an exemplary computer system 300 that may be utilized to implement methods described herein. A central processing unit (CPU) 302 is coupled to system bus 304. The CPU 302 may be any general-purpose CPU, although other types of architectures of CPU 302 (or other components of exemplary computer system 300) may be used as long as CPU 302 (and other components of computer system 300) supports the operations as described herein. Those of ordinary skill in the art will appreciate that, while only a single CPU 302 is shown in FIG. 3, additional CPUs may be present. Moreover, the computer system 300 may comprise a networked, multi-processor computer system that may include a hybrid parallel CPU/GPU system. The CPU 302 may execute the various logical instructions according to various teachings disclosed herein. For example, the CPU 302 may execute machine-level instructions for performing processing according to the operational flow described.

The computer system 300 may also include computer components such as non-transitory, computer-readable media. Examples of computer-readable media include a random access memory (RAM) 306, which may be SRAM, DRAM, SDRAM, or the like. The computer system 300 may also include additional non-transitory, computer-readable media such as a read-only memory (ROM) 308, which may be PROM, EPROM, EEPROM, or the like. RAM 306 and ROM 308 hold user and system data and programs, as is known in the art. The computer system 300 may also include an input/output (I/O) adapter 310, a graphics processing unit (GPU) 314, a communications adapter 322, a user interface adapter 324, a display driver 316, and a display adapter 318.

The I/O adapter 310 may connect additional non-transitory, computer-readable media such as storage device(s) 312, including, for example, a hard drive, a compact disc (CD) drive, a floppy disk drive, a tape drive, and the like to computer system 300. The storage device(s) may be used when RAM 306 is insufficient for the memory requirements associated with storing data for operations of the present techniques. The data storage of the computer system 300 may be used for storing information and/or other data used or generated as disclosed herein. For example, storage device(s) 312 may be used to store configuration information or additional plug-ins in accordance with the present techniques. Further, user interface adapter 324 couples user input devices, such as a keyboard 328, a pointing device 326 and/or output devices to the computer system 300. The display adapter 318 is driven by the CPU 302 to control the display on a display device 320 to, for example, present information to the user such as subsurface images generated according to methods described herein.

The architecture of computer system 300 may be varied as desired. For example, any suitable processor-based device may be used, including without limitation personal computers, laptop computers, computer workstations, and multi-processor servers. Moreover, the present technological advancement may be implemented on application specific integrated circuits (ASICs) or very large scale integrated (VLSI) circuits. In fact, persons of ordinary skill in the art may use any number of suitable hardware structures capable of executing logical operations according to the present technological advancement. The term "processing circuit" encompasses a hardware processor (such as those found in the hardware devices noted above), ASICs, and VLSI circuits. Input data to the computer system 300 may include various plug-ins and library files. Input data may additionally include configuration information.

Preferably, the computer is a high performance computer (HPC), known to those skilled in the art. Such high performance computers typically involve clusters of nodes, each node having multiple CPU's and computer memory that allow parallel computation. The models may be visualized and edited using any interactive visualization programs and associated hardware, such as monitors and projectors. The architecture of system may vary and may be composed of any number of suitable hardware structures capable of executing logical operations and displaying the output according to the present technological advancement. Those of ordinary skill in the art are aware of suitable supercomputers available from Cray or IBM or other cloud computing based vendors such as Microsoft, Amazon.

The above-described techniques, and/or systems implementing such techniques, can further include hydrocarbon management based at least in part upon the above techniques, including using the one or more generated geological models in one or more aspects of hydrocarbon management. For instance, methods according to various embodiments may include managing hydrocarbons based at least in part upon the one or more generated geological models and data representations (e.g., seismic images, feature probability maps, feature objects, etc.) constructed according to the above-described methods. In particular, such methods may include drilling a well, and/or causing a well to be drilled, based at least in part upon the one or more generated geological models and data representations discussed herein (e.g., such that the well is located based at least in part upon a location determined from the models and/or data representations, which location may optionally be informed by other inputs, data, and/or analyses, as well) and further prospecting for and/or producing hydrocarbons using the well. For example, the different stages of exploration may result in data being generated in the respective stages, which may be iteratively used by the machine learning to generate the one or more geological models discussed herein.

It is intended that the foregoing detailed description be understood as an illustration of selected forms that the invention can take and not as a definition of the invention. It is only the following claims, including all equivalents, that are intended to define the scope of the claimed invention. Further, it should be noted that any aspect of any of the preferred embodiments described herein may be used alone or in combination with one another. Finally, persons skilled in the art will readily recognize that in preferred implementation, some or all of the steps in the disclosed method are performed using a computer so that the methodology is computer implemented. In such cases, the resulting physical properties model may be downloaded or saved to computer storage.

The following example embodiments of the invention are also disclosed:

Embodiment 1

A computer-implemented method for transforming seismic data into a subsurface physical property model, comprising:
  accessing the seismic data; and
  constructing the subsurface physical property model by performing tomographic inversion of the seismic data, using a computer, with residual depth errors (RDE);
  wherein the RDE are reconstructed from time lags of wave equation migration.

Embodiment 2

The method of embodiment 1:
  wherein the RDE are directly reconstructed using the time lags of wave equation migration.

Embodiment 3

The method of any of embodiments 1 or 2,
  wherein a derivation between the RDE and the time lags of wave equation migration is based on a migrated gather being in a predetermined orientation when a depth image is focused at a location for the RDE.

Embodiment 4

The method of any of embodiments 1-3,
  wherein the predetermined orientation comprises a flat orientation.

Embodiment 5

The method of any of embodiments 1-4,
wherein the derivation between the RDE and the time lags of wave equation migration is based on an imaged depth, an open angle at an image point, and a velocity at the image point.

Embodiment 6

The method of any of embodiments 1-5,
wherein the RDE are reconstructed using the following relationship at each image point:

$$-D\left(\frac{v}{\cos\theta_s + \cos\theta_g}\right)\tau$$

wherein D is a deviation operator, v is the velocity at the image point, $\theta_s$ is reflection angle from shot, and $\theta_g$ is reflection angle from geophone.

Embodiment 7

The method of any of embodiments 1-6,
wherein D, the deviation operator, operates on a n-dimensional vector $z=\{z_j\}$, by:

$$(Dz)_i \equiv z_i - \frac{1}{n}\sum_j z_j.$$

wherein n is a number of open angles and j is an angle index.

Embodiment 8

The method of any of embodiments 1-7,
wherein the tomographic inversion comprises ray-based tomographic inversion.

Embodiment 9

The method of any of embodiments 1-7,
wherein the tomographic inversion comprises wave-based tomographic inversion.

Embodiment 10

The method of any of embodiments 1-9,
wherein the reconstructed RDE is imported into a tomographic inversion work flow in order to update at least one property of the subsurface physical property model; and
wherein the at least one property comprises vertical velocity, anisotropy parameters, or other parameters contributed to velocity.

Embodiment 11

The method of any of embodiments 1-10,
further comprising selecting the time lags based on a flattest pseudo migration offset gathers.

Embodiment 12

The method of any of embodiments 1-11,
wherein the pseudo migration offset gathers are generated by one-way wave equation migration or reverse time migration.

Embodiment 13

The method of any of embodiments 1-12,
further comprising selecting the time lags based on a best migrated stack responses.

Embodiment 14

The method of any of embodiments 1-13,
wherein the migrated stacked responses are generated by one-way wave equation migration or reverse time migration.

Embodiment 15

The method of any of embodiments 1-14,
wherein the tomographic inversion is solely based on the reconstructed RDE using the derivation between the RDE and the time lags of wave equation migration.

Embodiment 16

The method of any of embodiments 1-15,
wherein the tomographic inversion is based on the reconstructed RDE using the derivation between the RDE and the time lags of wave equation migration and on an RDE estimated from migrated gathers that are generated using base migration velocity.

Embodiment 17

The method of any of embodiments 1-16,
wherein the subsurface property model is constructed by iteratively performing tomographic inversion of the seismic data with RDE; and
wherein at least some iterations of performing tomographic interview of the seismic data are based on the RDE reconstructed from the time lags of the wave equation migration.

Embodiment 18

The method of any of embodiments 1-17,
wherein each of the iterations of performing tomographic interview of the seismic data are based on the RDE reconstructed from the time lags of the wave equation migration.

Embodiment 19

The method of any of embodiments 1-18,
further comprising managing hydrocarbons in the subsurface based on the subsurface physical property model.

Embodiment 20

The method of any of embodiments 1-19,
further comprising:
generating an image based on the subsurface physical property model; and
outputting the image on a display.

Embodiment 21

A non-transitory computer readable medium having stored thereon software instructions that, when executed by a processor, cause the processor to perform the method of any of embodiments 1-20.

Embodiment 22

A system comprising a processor and a memory, the processor in communication with the memory, the memory having stored thereon software instructions that, when executed by the processor, cause the processor to perform the method of any of embodiments 1-20.

REFERENCES

The following references are hereby incorporated by reference herein in their entirety:

Liu, J., Quan, H., Li, X., and Marcinkovich, C., Velocity tomography using property scans: 2018 SEG Expanded Abstracts, 5157-5161.

Mackay, S., and Abma, R., Depth-focusing analysis using wavefront-curvature criterion: Geophysics, 57, 1608-1622 (1992).

Yang, T., and Sava, P., 2013, 3D angle gathers from wave-equation extended images: 2013 SEG Expanded Abstracts, 4816-4821.

What is claimed is:

1. A method for performing hydrocarbon management in a subsurface formation, including transforming seismic data into a subsurface physical property model, the method comprising:
   accessing the seismic data;
   constructing the subsurface physical property model by performing tomographic inversion of the seismic data, using a computer, with residual depth errors (RDE);
   wherein the RDE are reconstructed from time lags of wave equation migration resulting in reconstructed RDE; and
   using the reconstructed RDE in one or both of a development stage in which one or more actions are performed in the subsurface formation, or an extraction stage in which hydrocarbons are extracted from the subsurface formation.

2. The method of claim 1, wherein the RDE are directly reconstructed using the time lags of wave equation migration.

3. The method of claim 2, wherein a derivation between the RDE and the time lags of wave equation migration is based on a migrated gather being in a predetermined orientation when a depth image is focused at a location for the RDE.

4. The method of claim 3, wherein the predetermined orientation comprises a flat orientation.

5. The method of claim 4, wherein the derivation between the RDE and the time lags of wave equation migration is based on an imaged depth, an open angle at an image point, and a velocity at the image point.

6. The method of claim 5, wherein the RDE are reconstructed using the following relationship at each image point:

$$-D\left(\frac{v}{\cos\theta_s + \cos\theta_g}\right)\tau$$

wherein D is a deviation operator, v is the velocity at the image point, $\theta_s$ is reflection angle from shot, and $\theta_g$ is reflection angle from geophone.

7. The method of claim 6, wherein D, the deviation operator, operates on a n-dimensional vector $z=\{z_j\}$, by:

$$(Dz)_i \equiv z_i - \frac{1}{n}\sum_j z_j$$

wherein n is a number of open angles and j is an angle index.

8. The method of claim 4, wherein the tomographic inversion comprises ray-based tomographic inversion.

9. The method of claim 8, wherein the tomographic inversion comprises wave-based tomographic inversion.

10. The method of claim 4, wherein the reconstructed RDE is imported into a tomographic inversion work flow in order to update at least one property of the subsurface physical property model; and
    wherein the at least one property comprises vertical velocity, anisotropy parameters, or other parameters contributed to velocity.

11. The method of claim 4, further comprising selecting the time lags based on a flattest pseudo migration offset gathers.

12. The method of claim 11, wherein the pseudo migration offset gathers are generated by one-way wave equation migration or reverse time migration.

13. The method of claim 4, further comprising selecting the time lags based on a best migrated stack responses.

14. The method of claim 13, wherein the migrated stacked responses are generated by one-way wave equation migration or reverse time migration.

15. The method of claim 4, wherein the tomographic inversion is solely based on the reconstructed RDE using the derivation between the RDE and the time lags of wave equation migration.

16. The method of claim 4, wherein the tomographic inversion is based on the reconstructed RDE using the derivation between the RDE and the time lags of wave equation migration and on an RDE estimated from migrated gathers that are generated using base migration velocity.

17. The method of claim 1, wherein the subsurface physical property model is constructed by iteratively performing tomographic inversion of the seismic data with RDE; and
    wherein at least some iterations of performing tomographic interview of the seismic data are based on the RDE reconstructed from the time lags of the wave equation migration.

18. The method of claim 17, wherein each of the iterations of performing tomographic interview of the seismic data are based on the RDE reconstructed from the time lags of the wave equation migration.

19. The method of claim 1, further comprising:
    generating an image based on the subsurface physical property model; and
    outputting the image on a display.

20. The method of claim 1, further comprising:
    performing a seismic survey to obtain the seismic data.

* * * * *